and are readily reduced, either chemically or electrically, and change color from colorless to intense blue-violet. The reduced form is readily oxidized with oxygen in air or dissolved in solution so that it is useful for deoxygenating gases or liquids with the color change being a self-indicator of the redox state of the polymer. These compositions can be made so that they are soluble or insoluble in aqueous media and form polyelectrolyte complexes with cation exchange resins.

United States Patent Office 3,694,384
Patented Sept. 26, 1972

3,694,384
REDOX POLYMERS
Arnold Factor, Scotia, and George E. Heinsohn, Ithaca, N.Y., assignors to General Electric Company
No Drawing. Filed Jan. 11, 1971, Ser. No. 105,642
Int. Cl. C08g 33/06
U.S. Cl. 260—2.2 R                     11 Claims

ABSTRACT OF THE DISCLOSURE

Redox polymers, which, in the oxidized cationic form, contain repeating units of the formula:

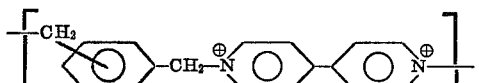

This invention relates to redox polymers, i.e. polymers which have a stable oxidized and reduced form and are reversibly converted from one form to the other. More specifically this invention relates to redox polymers which, in the oxidized cationic form, have repeating units containing the bipyridinium unit,

I

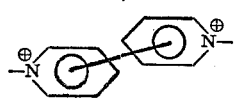

which preferable is the 4,4'-bipyridinium unit

II

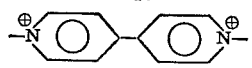

The balance of the repeating unit of the redox polymers is the xylylene group, which can be ortho-, meta- or para-xylylene. These repeating units therefore, are xylylene-bipyridinium units which, in the oxidized cationic form, have the formula:

III

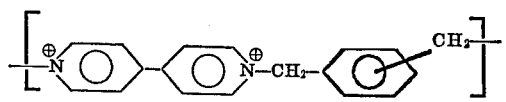

As will be discussed in more detail later, the anions which are in association with the bipyridinium cations can be any of the simple anions, for example halide, nitrate, sulphate, carbonate, bicarbonate, phosphate, etc. or they may be polyanions of a cation exchange resin.

Oxidation-reduction polymers, commonly referred to as redox polymers, have been known since about the mid 1940's. Since then, considerable work has been done in ing their properties and uses. An excellent summary of synthesizing various types of redox polymers and studying their properties and uses. An excellent summary of this work is contained in the book "Oxidation-Reduction Polymers" by Harold G. Cassidy and Kenneth A. Kun, Interscience Publishers, New York, 1965. This book and the references cited therein are hereby incorporated by reference as a teaching of the technology of redox polymers and their various uses.

In general these resins depend upon modifying a polymer to incorporate a structure capable of existing in either an oxidized or reduced state. Most of these polymers incorporate a compound which has a quinone structure in the oxidized form and hydroquinone structure in the reduced form. One of the earliest applications for these resins was the removal of oxygen from boiler feed water using the reduced form of the redox polymer which removed the oxygen by being oxidized. One of the drawbacks of most redox polymers is that the active group could not be incorporated into the backbone of the polymer but generally was a pendant group off of the backbone polymer or was actually only an ingredient incorporated into a matrix of another polymer. In addition, these resins are hydrophobic, but most applications need redox polymers having hydrophilic properties which requires still further modification of the basic polymer. The resins are relatively expensive to make and they have no convenient way of being monitored as to their oxidation or reduction state.

We have now found that extremely useful redox polymers can be readily prepared from easily available materials. These polymers are hydrophilic and the change from the reduced to the oxidized state is accompanied by a very dramatic color change from blue or blue-violet to colorless so that the oxidation or reduction state of the polymer is readily determined by visual means. These polymers are readily prepared by reacting a xylylene halide, generally xylylene chloride or xylylene bromine with bipyridyl. The xylylene halide can be any of the three isomers: ortho-, meta- or para-xylylene dihalide. Although theoretically 2,2'-bipyridyl could be used, we have found that for some unexplained reason, probably steric, it does not readily react with the xylylene halides to form a redox polymer.

The reaction between the xylylene dihalide and the bipyridyl proceeds at room temperature. The reaction is conveniently carried out in a solvent for the reactants which is a non-solvent for the polymer. The particular solvent used is not critical and a convenient solvent is acetonitrile. Other solvents can of course be used. This particular solvent is a very good solvent for the reactants and the polymer precipitates permitting its recovery by filtration of the reaction mixture. Since no other product is produced, the filtrate can be used as the solvent in a succeeding reaction without purification. The polymer so produced is a polysalt in which the anions are the halide anion corresponding to the halide of the xylylene dihalide used in preparation of the polymer and the cation is the bipyridinium dication shown above in Formula II.

These polymers, as produced, are in the oxidized form and are readily soluble in water and various aqueous media forming colorless solutions, although in the solid state, they are yellow. When a reducing agent such as sodium dithionite, zinc dust, etc. is added to such an aqueous solution, a deep blue to blue-violet color is produced depending on the concentration of this polysalt. In the reduced cationic form, the polymer has repeating units having the formula:

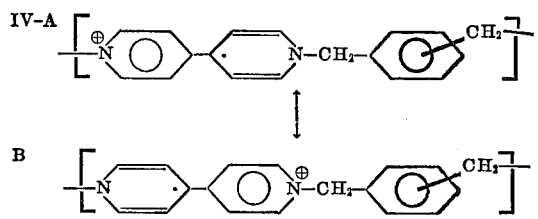

Because this unit is a delocalized free radical, it is recognized that it is a resonant structure which is conveniently illustrated by Formulas IV–A and B. With strong reducing agents, for example, sodium metal, complete reduction to a neutral, red polymer having repeating units having the formula:

V
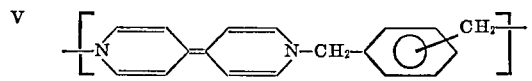

can occur and can be utilized if so desired, but such neutral polymer is incapable of forming the polyelectrolyte complexes discussed later.

The aqueous solution containing the reduced polymer, either having Formula IV or V, when shaken in the presence of air rapidly decolorizes as the polymer oxidize back to the form having units of Formula III, the state of oxidation being readily followed by the color changes.

When a polymer is desired which is not water-soluble two techniques can be used. One technique is to replace some or all of the xylylene dihalide with a tris(halomethyl)benzene, for example, mesityl trihalide. This produces cross-linking due to the trifunctionality of the trihalo compound. The other technique is to use an entirely different method of preparing the polymer which entails reaction of a xylylene dihalide with 4-cyanopyridine to form the bis-4-cyanopyridinium salt of xylylene dihalide. This salt is reduced with a reducing agent, such as sodium dithionite, to produce a polymer having repeating units having Formula IV. A side reaction occurs, which is as yet unknown, which produces a polymer which is not water-soluble apparently due to some cross-linking.

These water-insoluble, cross-linked polymers, prepared by either method, are yellow in their oxidized form but can be reduced to the highly colored, deep blue to blue-violet reduced form with an aqueous solution of a reducing agent. If an oxygen containing gas, for example, air, or a liquid containing dissolved oxygen is brought in contact with the reduced form of these cross-linked polymers, the oxygen is rapidly depleted from the gas or liquid providing a sufficient amount of the reduced resin is present to react with all of the oxygen. This is a self-indicating condition since the deep blue to blue-violet color persists as long as sufficient resin is present. When the resin is no longer capable of removing oxygen its color changes to yellow. This is a feature heretofore not found in any redox polymer of which we are aware. It is to be recognized that in case of an oxygen containing gas, the gas could be deoxygenated by bubbling it through a solution of the soluble form of the polymer in the reduced state.

The water-soluble resins of this invention are highly ionized in aqueous solution so that the particular anion in association with the cations of the polymer in solution is dependent upon the mass action effect of the various anions in the aqueous solution as will be readily recognized by those skilled in the art. Advantage of this can be taken to produce water-insoluble polyelectrolyte complexes by bringing a cation exchange resin, preferably in its salt form, in contact with the solution. The cation exchange resin can be either water-soluble or water-insoluble. If it is water-soluble and an aqueous solution of our redox polymer is mixed with an aqueous solution of the cation exchange resin, the polyelectrolyte complex will precipitate from solution. If our redox polymer is water-soluble and the cation exchange resin is water-insoluble, the redox polymer will be sorbed onto the cation exchange resin and removed from the aqueous solution. If our redox polymer is insoluble in water and a water-soluble cation exchange resin is used, the water-soluble cation exchange resin will be sorbed onto our redox polymer and be removed from the aqueous solution. These water-insoluble polyelectrolyte complexes still retain the redox properties of our redox polymers and therefore can be utilzed in the same manner as the redox polymers themselves, for example, they can be used for deoxygenating liquids or gases. In the formation of the polyelectrolyte complex, the anion in association with the cation of the redox polymer forms a salt with the cation of the cation exchange resin. By proper choice of the cations associated with the cationic exchange resin and anions associated with our redox polymer the salt so formed will be water-soluble and therefore will not precipitate with and can be separated from the water-insoluble polyelectrolyte complex.

Since the ability of a cation exchange resin to form the polyelectrolyte complex with our redox polymers is only dependent on the presenec of anionic groups in the resin, which is characteristic of all cation exchange resins, we can use any cation exchange resin in forming the polyelectrolyte complexes with our redox polymers. The stability of the complex is increased as the strength of the acidic group of the cation exchange resin increases. These cation exchange resins are characterized by having an acidic group, generally sulfonic, phosphonic, phosphorous, phosphoric, or carboxylic acid groups, for example, polystyrene sulfonic, phosphonic, phosphorus, etc., acids: phenolic resins with sulfonic, methylene sulfonic, phosphoric, etc., acid groups; polyethylene sulfonic acids, polyacrylic acids, etc., either as homopolymers or copolymers. Since the ion exchange capacity of these resins is governed by the number of acid groups per polymer molecule and since these groups tend to make the polymer hydrophilic, the cation exchange resins will be water soluble unless they are cross-linked, for example, by electron beam radiation, peroxide cross-linking, copolymerizing with a polyfunctional monomer (i.e., a monomer having more than one polymerizable group, for example, divinyl benzene), etc. For a further discussion of such polymers reference is made to the published literature especially the books on ion exchange resins for example "Ion Exchangers in Organic and Biochemistry" edited by Calvin Calmon, and T. R. E. Kressman, Interscience Publishers, Inc., New York, 1957, "Ion Exchange Resins," Robert Kunin and Robert J. Myers, John Wiley and Sons, Inc., New York, 1950, "Ion-Exchange Resins," J. A. Kitchner, Methuen & Co., Ltd., London, 1957, "Ion Exchange Technology," edited by F. C. Nachod and Jack Schubert, Academic Press, Inc., New York, 1956, "Duolite Ion-Exchange Manual," Technical Staff of Chemical Process Co., Redwaood City, Calif., 1960.

The particular cation exchange resins used are not critical to this invention. Since they are the most readily available commercially, are cheapest in cost and form excellent polyelectrolyte complexes we prefer to use the polystyrene sulfonic acids, polyethylene sulfonic acids or polyacrylic acids. As previously mentioned they can be either water-soluble or water-insoluble. It will be recognized that these resins have in common the fact that for their type, each has the minimum molecular weight per polymer unit and therefore have the highest exchange capacity per unit weight in comparison with other cation exchange resins of the same type having the same average number of cation exchange groups per repeating unit of the polymer.

Since both our redox polymers and their complexes with cation exchange resins readily absorb oxygen either from gases or liquids, their usual form will be in the oxidized state. Any discussion or description which follows will assume that the reader knows that the oxidized form is intended unless the reduced form is specifically mentioned.

The polyelectrolyte complexes have one unique useful property not possessed by the redox polymers themselves. In their reduced form the polyelectrolyte complexes can remove cations from solution. Furthermore if the cation removed is a monovalent cation the complex even after absorbing the monovalent cation is still capable of acting as a cation exchange resin for removing polyvalent cations from solution since our polyelectrolyte complexes have an extremely strong preferential affinity for polyvalent cations over monovalent cations. This preferential affinity is readily apparent if one places the reduced form of our complex in an aqueous solution containing a high concentration of a monovalent cation, for example, sodium ion, and only a low concentration of polyvalent ion, for example, calcium ion. Even under these conditions, where the mass action law would dictate adsorbtion of the monovalent cation, the reverse occurs and the divalent cation is preferentially adsorbed. Although this phenomenon has been noted for other cation exchange resins, the degree of preference is nowhere near as great as we have found for our polyelectrolyte complexes.

The basis for this ability to absorb cations from solution is due to the fact that the bipyridinium group in the repeating unit has two positive charges associated with it in the oxidized form and only one charge associated with it in the reduced form. In forming the polyelectrolyte complex the two charges of the oxidized form of the polymer are associated with two negative charges of the anionic groups of the cation exchange resin, forming a polysalt. When this complex is reduced so that the repeating unit now has the form as shown by Formula IV, which has only one positive charge, the one anion of the cation exchange resin previously associated with the positive charge which disappears on reduction, is freed in its hydrogen form making it available for absorbing a cation from solution. This is illustrated in the following equation. For illustrative purposes only, p-xylene-4,4′-bipyridinium dibromide is used as illustrative of our redox polymer and the sodium salt of polystyrene sulfonic acid is used as illustrative of the salt of a cation exchange resin:

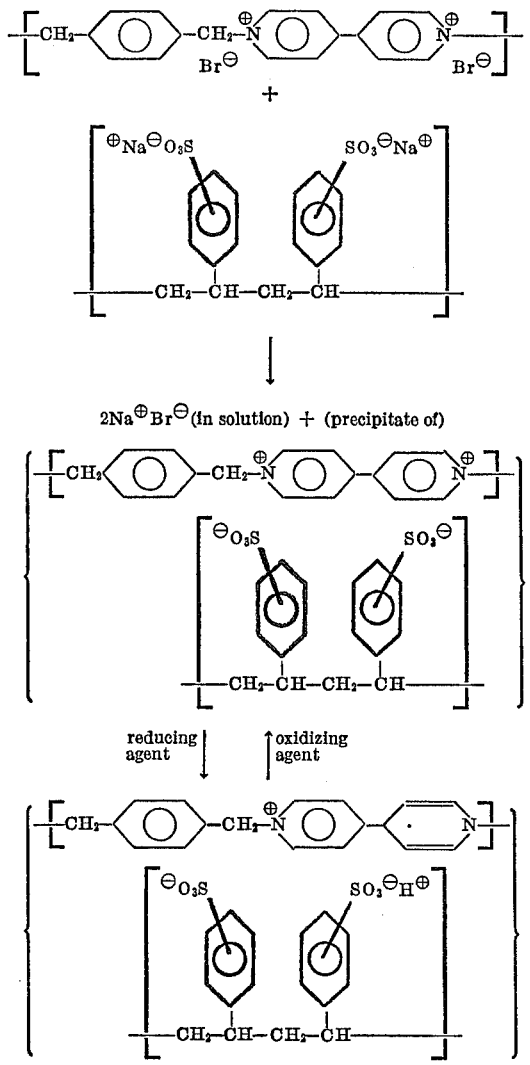

It is to be understood that if the reducing agent itself introduces a cation into solution that this cation will be the cation associated with the sulfonic acid group rather than the hydrogen as illustrated in the above equation. The reduction can be carried out electrochemically so as not to introduce cations into solution. A novel method of utilizing these complexes to deionize water is disclosed and claimed in the copending application of Arnold Factor, Ser. No. 105,643, filed concurrently herewith and assigned to the same assignee as the present invention.

In addition to the polymer complexes, our redox polymers can also form complexes with anions such as tetracyanodiquinomethan anion, hereinafter referred to as $$TCNQ^{\ominus}$$

which are water insoluble but can be dissolved in aprotic solvents, for example, N-methyl pyrolidone, etc. These solutions can be cast into films, spun into fibers or otherwise fabricated into objects which are highly electrically conductive. For a further discussion of such compositions see for example, Lupinski et al., U.S. Pat. 3,346,444.

In order that those skilled in the art may better understand our invention the following examples are given by way of illustration and not by way of limitation. In all of the examples, parts are by weight and temperatures are in degrees Centigrade unless otherwise stated. Where analytical data is given the theoretical values are given in parentheses following the experimentally determined values unless specifically noted otherwise. Intrinsic viscosities, [η], were measured at 25° in 0.5 molar aqueous potassium bromide and are reported in deciliters per gram.

EXAMPLE 1

This example illustrates the synthesis of polyxylene-bipyridinium dibromides, hereinafter for brevity's sake the cationic portion of which is referred to as PXB and the usual anion abbreviations used, for example PXB-Br$_2$ for polyxylylene-bipyridinium dibromide. PXB-Br$_2$'s were prepared by reacting equimolar amounts of 4,4′ - bipyridyl, and α,α′-dibromoxylenes (either ortho, meta, or para) for 18 hours at room temperature in sufficient dry acetonitrile to provide a 5% solution of the product if it had all remained in solution. The resulting PXB-Br$_2$'s, recovered in 85 percent yield by filtration, were dried at 40°/20 mm. An additional 10% yield could be recovered by concentrating the filtrate by evaporation and precipitating with acetone. Analyses for typical polymers appear in Table I. These materials were infusible, decomposing only above 250°, as measured by thermal gravimetric analysis. The ultraviolet spectra of these polymers were identical, giving $$\lambda^{max.}_{H_2O}$$

of 261 nm. (ε=2×10⁴) compared to $$\lambda^{max.}_{H_2O}$$

of 260 nm. (ε=2.8×10⁴) for 1,1′-dibenzyl-4,4′-bipyridinium dibromide. A single light scattering molecular weight determination on a sample of para-PXB-Br$_2$ with [η] of .06 gave a molecular weight of 11,000 g./mole. These materials were soluble in water to the extent of 1–2% at room temperature.

TABLE I
Analysis of PXB-Br$_2$

| Positional isomer | [η] | E$_{½}$[b] | Percent | | | | T$_g$[a] |
| --- | --- | --- | --- | --- | --- | --- | --- |
| | | | C | H | N | Br | |
| Ortho | (c) | −0.351 | 51.3 | 4.0 | 6.8 | 37.8 | 153 |
| Meta | 0.04 | −0.445 | 51.5 | 4.0 | 7.0 | 35.3 | 101 |
| Para | 0.04 | −0.436 | 51.2 | 3.9 | 6.7 | 38.0 | 93 |
| Calculated for C$_{18}$H$_{16}$N$_2$Br$_2$ | | | 51.46 | 3.83 | 6.67 | 38.04 | |

[a] T$_g$=glass transition temperature, ° C.
[b] Volts vs. saturated calomel electrode measured polarographically in 0.1 M KCl buffered to pH 9; waves appeared irreversible; in all cases a second wave appears at E$_{½}$−0.854 volts vs. SCE.
[c] Too insoluble in 0.5 M KBr to measure, but water soluble.

The redox behavior of these materials was easily demonstrated by the repeated formation of the violet radical cation with reducing agents such as zinc dust or $Na_2S_2O_4$ and subsequent reoxidation by air or oxygen to the starting colorless salt. Polarographic analysis, Table I, indicates that the PXB-$Br_2$'s are reduced to radical cations at somewhat lower voltage than the model 1,1'-dibenzyl-4,4'-bipyridinium salt. At pH 9, 1,1'-dibenzyl-4,4'-bipyridinium bromide shows a reversible one electron reduction with $E_{1/2}$ at —0.597 v. vs. S.C.E. and a second irreversible reduction at $E_{1/2}$ —0.78 vs. S.C.E.

Attempts to substitute 2,2'-bipyridyl for the 4,4'-bipyridyl in the above syntheses gave no reaction even after refluxing overnight in acetonitrile, due probably to steric hindrance of the amine. However, $\alpha,\alpha'$-dichloroxylene is readily substituted for the corresponding bromides to produce PXB-$Cl_2$.

EXAMPLE 2

This example illustrates that 7,7,8,8-tetracyanoquinodimethan (hereinafter, for the sake of brevity designated as TCNQ) anion salts of PXB can be prepared which displayed electronic conduction.

salts of PXB-$Br_2$'s were prepared and tested by the method of Lupinski and Kopple U.S. Patent No. 3,346,444. Films of these materials could be cast from solutions of N-methylpyrolidone in an oxygen free atmosphere with or without added neutral TCNQ. The conductivities of these films are reported in Table II. The results indicate that the different isomers of PXB-TCNQ displayed different conductivities. As expected from work of Lupinski et al. for a given isomer the highest conductivities were obtained with those samples doped with TABLE II
Conductivities of PXB-TCNQ at 25°

| Sample | Percent neutral TCNQ | $\sigma_{25}°(\Omega^{-1}cm.^{-1})$ |
| --- | --- | --- |
| Ortho-PBX-TCNQ | 0 | $2.2 \times 10^{-3}$ |
| Ortho-PXB-TCNQ | a 0 | $1.8 \times 10^{-3}$ |
| Ortho-PXB-TCNQ | 16 | $2.0 \times 10^{-2}$ |
| Para-PXB-TCNQ | a 0 | $2.1 \times 10^{-4}$ |
| Para-PXB-TCNQ | 16 | $1.1 \times 10^{-3}$ |
| Meta-PXB-TCNQ | 15 | $9.6 \times 10^{-5}$ | a Sample washed 24 hrs. with benzene in Sohxlet extractor under nitrogen to remove any adventitious neutral TCNQ.

neutral TCNQ. The conductivity of ortho-PXB-TCNQ doped with 16% neutral TCNQ is among the highest ever reported for a film forming polymer. Elemental analysis of the ortho-PXB-TCNQ containing no neutral TCNQ indicates the following stoichiometry: Calcd. for $$(PXB)_2(TCNQ)_3Br$$

($C_{72}H_{44}N_{16}Br$): C, 71.3%; H, 3.6%; N, 18.5%; and Br, 6.6%. Found: C, 70.2%; H, 3.8%; N, 18.2%; Br, 6.1%. Electron spin resonance measurement of this material gave an intense signal at g.-value of 2.003 and line width of 0.48 gauss. Calibration with diphenylpicryhydrazyl indicates an equivalent weight of 580 g./spin compared to 404 g./spin calculated for $(PXB)_2(TCNQ)_3Br$.

The above polymeric TCNQ salts were found to react slowly with air as evidenced by a slow decay in conductivity over a period of several months.

The conductivities of a film of para-PXB-$Br_2$, a pellet of its reduced form,

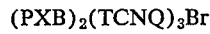

and a pellet of its poly(styrenesulfonate) polyelectrolyte complex, para-PXB-$(PSS)_2$, all gave conductivities of less than $10^{-9}\Omega^{-1}cm.^{-1}$. Examples of the usefulness of these conducting resins are enumerated in the above referenced patent of Lupinski et al.

The next three examples illustrate that water-insoluble redox polymers incorporating 4,4'-bipyridinium units can be prepared (1) by using multifunctional halogen units, (2) by forming 4,4'-byprdinium units by reductive coupling of 4-cyanopyridinium salts containing two or more 4-cyanopyridinium units or (3) by formation of polyelectrolyte complexes with polybipyridinium salts and various cation exchange polymers.

EXAMPLE 3

Illustrative of the first method is the use of $\alpha,\alpha',\alpha''$-tribromomesitylene, either by itself or in combination with $\alpha,\alpha'$-dibromoxylenes.

Polymesitylene bipyridinium bromide was prepared as follows: One mmole of 4,4'-bipyridyl and 0.67 mmole of $\alpha,\alpha',\alpha''$-tribromomesitylene, in 10 ml. of dry acetonitrile was heated 3 minutes at 100° giving an orange precipitate which was stirred overnight at room temperature. This mixture was diluted with 15 ml. $H_2O$ and heated an additional 30 minutes. The product was separated by filtration, washed with water and vacuum dried yielding 0.2575 gm. (65%) of an orange solid.

*Elemental analysis.*—Found (percent): C, 45.1; H, 4.0; N, 6.5; Br, 32.1. Calcd. for $C_{16}H_{10}N_2Br_2$ (percent): C, 48.8; H, 3.6; N, 7.1; Br, 40.6.

The disparity between the actual analysis and the one predicted for 100% reaction indicates an incomplete incorporation of bipyridyl because of inhomogeneity during the reaction. Nonetheless this material still gave a strong violet color with $Na_2S_2O_4$ showing the presence of the bipyridinium group in the polymer.

A redox polymer containing both mesitylene and xylylene units was prepared as follows: A mixture of 0.312 gm. (2 mmoles) bipyridyl, 0.264 gm. (1 mmole) p-dibromoxylene, and 0.238 gm. (0.67 mmole) tribromomesitylene in 25 ml. dry acetonitrile was heated at 100° for 5 minutes and then allowed to stand overnight at 25°. The resulting orange precipitate was diluted with 15 ml. $H_2O$ and the mixture warmed 20 minutes at 100°, resulting in a gelatinous slurry. This material was separated and washed by centrifugation and dried in vacuum to yield .0473 gm. (5.8% yield) of product. Elemental analysis gave C, 49.2%; H, 4.0%; N, 6.6%. Calculated for $C_{17}H_{15}N_2Br_2 \cdot \frac{1}{2}H_2O$; C, 49.2%; H, 3.9%; N. 6.7%. $C_{17}H_{15}N_2Br_2$ is the empirical formula expected from the reaction of 1 bipyridyl $C_{10}H_8N_2$, $\frac{1}{2}$ xylyl dibromide, $C_4H_4Br$, and $\frac{1}{3}$ tribromomesitylene, $C_3H_3Br$. This material gave a positive viologen color test with $Na_2S_2O_4$ indicating the presence of bipyridinium units.

EXAMPLE 4

Illustrative of the second method for forming water-insoluble redox polymers containing xylylene-4,4'-bipyridinium units is the use of the reductive coupling reaction of xylylene bis(4-cyanopyridinium) salts. In the case of disubstituted 4-cyanopyridinium salts one might expect to obtain, a water-soluble material with a linear structure identical with that of Example 1. However, an unknown side reaction occurs which results in a cross-linked, water-insoluble resin containing these units. This is illustrated below in the synthesis of a cross-linked polyxylylene-bipyridinium dibromide. A degassed solution of 0.472 g. (10 mmoles) of the bis-4-cyanopyridinium salt of $\alpha,\alpha'$-dibromo-p-xylene in 50 ml. of 50% aqueous acetone was treated dropwise over a 2 hour period in an oxygen free system with .696 g. (40 mmoles) of sodium dithionite in 25 ml. of pH 10.6 buffer. The first drop of reducing solution produced an intense blue color which persisted. When addition was complete, oxygen was bubbled through the system and the resulting orange precipitate collected by filtration. Yield: 0.22 g. This material was not soluble in any solvent, e.g., DMF, DMSO, water, acetone, trifluoroacetic acid, ether, and chloroform. The material darkens above 90° C., but did not melt, even at 300°. The infrared spectrum in KBr pellet of this material had a band at 2220 cm.$^{-1}$, evidence for the presence of nitrile group in the material. However, elemental analysis indicates that these cyano groups are present as anions since the bromide content of the polymer is only 10% of the expected value. The data indicate that the material is cross-linked. The material could be reversibly reduced to a violet radical cation by sodium dithionite.

EXAMPLE 5

The formation of polyelectrolyte complexes is a third way of producing water-insoluble redox resins. Our polybipyridinium resins readily form polysalts or polyelectrolyte complexes with polyanions. For example, solutions of PXB-Br$_2$'s form precipitates with solutions of sodium poly(styrenesulfonate) or sodium polyacrylate. Also, PXB-Br$_2$'s are found to be strongly adsorbed onto both strong acid and weak acid water-insoluble cation exchange resins, for example, a cross-linked sodium poly(styrenesulfonate), a cross-linked polystyrene containing disodium methyleneiminodiacetate groups; a cross-linked polystyrene containing sodium phosphonate groups, etc. retaining the bead form of the resin. The above polyelectrolyte complexes are insoluble in common solvents but still retain their redox activity in solid form as evidenced by an immediate reduction with Na$_2$S$_2$O$_4$ to produce violet radical cations and subsequent reoxidation by air or oxygen to the original leuco salt. In addition it was found this redox cycle could be repeated indefinitely without any dimunition of effect. Those complexes which retain the bead form of the cation exchange resins are particularly useful as solid bed deoxygenating systems.

Preparation of polyelectrolyte complexes of PXB-Br$_2$ and sodium poly(styrenesulfonate) was accomplished by mixing an aqueous solution containing PXB-Br$_2$ with an aqueous solution containing a chemical equivalent of sodium poly(styrenesulfonate). The resulting tan solids, obtained in up to 94% yield after drying at 40°/20 mm., analyzed for the stoichiometry predicted as indicated in Table III. The batch of sodium poly(styrenesulfonate) used, was found to contain 50 mole percent NaCl which gives rise to traces of NaCl in the product.

TABLE III

Elemental analysis of polyelectrolyte complexes of PXB-Br$_2$ and poly(styrenesulfonate)

| Complex | C | H | N | S | Na | Br | Cl | O |
|---|---|---|---|---|---|---|---|---|
| Meta-PXB | 57.8 | 4.9 | 4.0 | 8.8 | | 1.44 | 0.83 | |
| Para-PXB | 57.6 | 5.1 | 4.0 | 8.7 | | 2.46 | 0.88 | |
| Ortho-PXB | 57.9 | 4.9 | 4.0 | 8.8 | 1.1 | 1.14 | 0.61 | |
| Calculated [a] | 57.1 | 5.2 | 3.9 | 9.0 | 1.0 | 1.8 | 0.8 | 21.2 |

[a] Calc. for (C$_{18}$H$_{16}$N$_2$)·(C$_8$H$_7$SO$_3$)$_2$·(NaCl)$_{.16}$·(NaBr)$_{.14}$·(H$_2$O)$_{1.5}$.

These complexes were soluble in ternary solvents such as conc. HCl, H$_2$O, dioxane (45:5:50 by volume) or NaBr, H$_2$O, acetone (30:55:15 by weight). Clear films of these complexes could be cast from either of these ternary solvents. If the films were allowed to completely dry, they become quite brittle and cracked.

These polyelectrolyte complexes can be made in intimate contact with various fillers either by performing the original synthesis in the presence of the filler or by dispersing the filler in a solution of the complex in a suitable ternary solvent and isolating by causing the complex to precipitate by evaporation or changing the solvent composition to a ratio in which the complex is no longer soluble.

EXAMPLE 6

The polyelectrolyte complex of PXB-Br$_2$ and sodium polyacrylate was prepared in the following manner. To 1 mmole of sodium polyacrylate (equiv. wt. 97 g./equiv.) in 100 ml. water stirred in a Waring Blendor was added 0.5 mmole of para-PXB-Br$_2$ in 100 ml. of water. The resulting precipitate was collected, washed with water and dried in vacuum to yield 84% of a dark orange solid.

*Elemental analysis.*—Calculated for

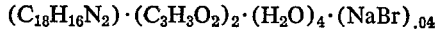

(percent): C, 60.2; H, 6.3; N, 5.9; O, 26.74; Na, 0.2; Br, 0.7. Found (percent): C, 62.1; H, 5.9; N, 5.8; Na, 0.2.

The analysis indicates a near theoretical stoichiometry for this polyelectrolyte complex. Reversible redox behavior was exhibited by this material by repeated reductions with Na$_2$S$_2$O$_4$ and oxidation by air.

EXAMPLE 7

The polyelectrolyte complex of PXB-Br$_2$ and sodium poly(ethylenesulfonate) was prepared by mixing 4.2 g. (10 mmoles) of para-PXB-Br$_2$ in 400 ml. of water with 1.30 g. (10 mmoles) of sodium poly(ethylenesulfonate) in 100 ml. of water. The resulting white precipitate was isolated by centrifugation, washed three times with water and twice with acetone and dried at 25°/20 mm. to yield 1.9 g., 50% yield, of a light green powder.

*Elemental analysis.*—Calculated for

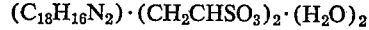

(percent): C, 51.75; H, 5.13; N, 5.49; S, 12.56. Found (percent): C, 52.05; H, 4.95; N, 5.95; S, 12.3.

Reversible redox behavior was exhibited by this material by repeated reductions with Na$_2$S$_2$O$_4$ and oxidations by air.

The above examples have illustrated some of the variations and modifications of the present invention. But obviously, other modifications and variations are possible in light of the above teachings. For example, polymers containing reactive halomethyl groups, e.g., halomethylated polystyrenes, halomethylated polyphenylene oxides (see Hay Pat. 3,262,911), etc. can be reacted with either 4,4'-bipyridyl or preferably with 4-cyanopyridine followed by reductive coupling as described above. Surprisingly, although these halomethylated polymers and 1,4-dibromo-2-butene can be used in place of the xylylene dihalides to form redox polymers, other compounds containing two reactive halogens cannot for example, dibromomethane, 1,2-dibromoethane, α,α'-dichloroacetone, bis(p-fluorophenyl) sulfone, p,p'-difluorobenzophenone, etc.

Other cation exchange resins than those given in the specific examples have been used to form the polyelectrolyte complexes, for example, a hydrolyzed maleic anhydride vinyl methyl ether copolymer having amide and sodium salt groups, poly(2,6-diphenyl-1,4-phenylene oxide) having sodium sulfonate groups on the phenylene ring, poly(2,6 - dimethyl - 1,4-phenylene oxide) having lithium carboxylate groups on the phenylene ring, a copolymer of acrylamide and acrylic acid, etc.

The compositions have many uses other than those illustrated. Their ion exchange properties can be utilized to treat aqueous media, to catalyze reactions, to separate one ion preferentially from other ions, etc. The redox properties can be used to perform oxidation or reduction reactions, to deoxygenate aqueus media, etc.

All these variations and combinations will be readily apparent to those skilled in the art and are within the full intended scope of the invention as defined by the appended claims.

What we claim as new and desire to secure by Letters Patent of the United States is:

1. A redox polymer whose repeating units in their oxidized cationic form have the formula (A)

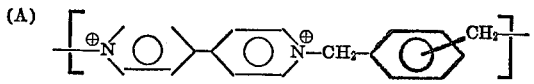

in their reduced, free-radical form have the resonant structure

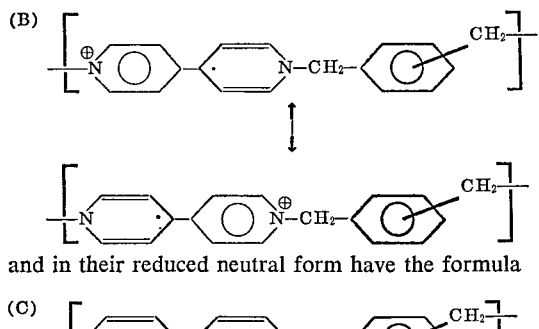

and in their reduced neutral form have the formula (C) [diagram: —N⟨⟩=⟨⟩—N—CH₂—⟨⟩—CH₂—]

2. A water-insoluble redox polymer of claim 1.
3. A polyelectrolyte complex comprising the redox polymer of claim 1, in one of its two polycationic forms A or B, with the polyanions of a cation exchange resin.
4. The polyelectrolyte complex of claim 3 wherein the cation exchange resin is a water-soluble resin.
5. The polyelectrolyte complex of claim 3 wherein the cation exchange resin is a water-insoluble resin.
6. The polyelectrolyte complex of claim 3 wherein the cation exchange resin is a polysulfonic acid.
7. The polyelectrolyte complex of claim 6 wherein the resin is a polystyrene sulfonic acid.
8. The polyelectrolyte complex of claim 7 where the polysulfonic acid is a water-soluble polystyrene sulfonic acid.
9. The polyelectrolyte complex of claim 7 wherein the polysulfonic acid is a water-insoluble polystyrene sulfonic acid.
10. The polyelectrolyte complex of claim 6 wherein polysulfonic acid is a polyethylene sulfonic acid.
11. The polyelectrolyte complex of claim 3 wherein the cation exchange resin is a polyacrylic acid.

References Cited
UNITED STATES PATENTS 3,242,105  3/1966  Waack.
T. 872,003  3/1970  Laakso et al.

OTHER REFERENCES

Newport et al.: Soc. Chem. Ind. Monogr. No. 26, 131–40 (1967).

Laskorin et al.: Zhur. Prikled. Khim. 34, 881–88 (1961).

MELVIN GOLDSTEIN, Primary Examiner

U.S. Cl. X.R.
260—2 R, 2.1 R, 874

UNITED STATES PATENT OFFICE
CERTIFICATE OF CORRECTION

Patent No. 3,694,384　　　Dated September 26, 197_

Inventor(s) Arnold Factor and George E. Heinsohn

It is certified that error appears in the above-identified patent and that said Letters Patent are hereby corrected as shown below:

Column 1, line 60, cancel the line in its entirety.
Claim 1, line 3, formula (A) should read as follows:

(A) 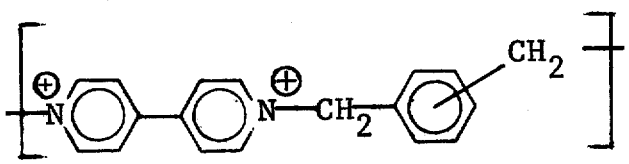

Signed and sealed this 22nd day of May 1973.

(SEAL)
Attest:

EDWARD M. FLETCHER, JR.
Attesting Officer

ROBERT GOTTSCHALK
Commissioner of Patents